United States Patent
Palin et al.

(10) Patent No.: US 7,278,084 B2
(45) Date of Patent: Oct. 2, 2007

(54) METHOD AND SYSTEM FOR PROVIDING COMMUNICATIONS SECURITY

(75) Inventors: Arto Palin, Viiala (FI); Markka A. Oksanen, Helsinki (FI); Harald Kaaja, Helsinki (FI); Juha Salokannel, Kangasala (FI)

(73) Assignee: Nokia Corporation, Espoo (FI)

( * ) Notice: Subject to any disclaimer, the term of this patent is extended or adjusted under 35 U.S.C. 154(b) by 484 days.

(21) Appl. No.: 10/694,881

(22) Filed: Oct. 29, 2003

(65) Prior Publication Data

US 2005/0097408 A1    May 5, 2005

(51) Int. Cl.
*H03M 13/00* (2006.01)
(52) U.S. Cl. .............. 714/758; 714/41; 714/52; 714/703
(58) Field of Classification Search ........... 714/703, 714/41, 52, 758; 455/41.2
See application file for complete search history.

(56) References Cited

U.S. PATENT DOCUMENTS

| | | | |
|---|---|---|---|
| 5,307,370 A | 4/1994 | Eness | |
| 5,677,927 A | 10/1997 | Fullerton et al. | |
| 5,687,169 A | 11/1997 | Fullerton | |
| 6,144,464 A * | 11/2000 | Rupp et al. | 358/442 |
| 6,172,673 B1 | 1/2001 | Lehtinen et al. | |
| 6,349,199 B1 | 2/2002 | Armantrout | |
| 6,507,734 B1 | 1/2003 | Berger et al. | |
| 6,539,503 B1 * | 3/2003 | Walker | 714/703 |
| 6,549,567 B1 | 4/2003 | Fullerton | |
| 6,571,089 B1 | 5/2003 | Richards et al. | |
| 6,571,212 B1 * | 5/2003 | Dent | 704/270.1 |
| 6,587,949 B1 | 7/2003 | Steinberg | |
| 6,799,287 B1 * | 9/2004 | Sharma et al. | 714/703 |
| 6,961,541 B2 * | 11/2005 | Overy et al. | 455/41.2 |
| 6,993,343 B2 | 1/2006 | Yoshii et al. | |
| 7,096,033 B1 | 8/2006 | Bell | |
| 2001/0049262 A1 | 12/2001 | Lehtonen | |
| 2001/0055356 A1 | 12/2001 | Davies | |
| 2002/0003792 A1 | 1/2002 | Schmidt et al. | |
| 2002/0065099 A1 | 5/2002 | Bjorndahl | |
| 2002/0073269 A1 | 6/2002 | Kawashima et al. | |
| 2002/0080866 A1 | 6/2002 | Bouet et al. | |
| 2002/0151276 A1 | 10/2002 | Ito | |

(Continued)

FOREIGN PATENT DOCUMENTS

CA    2443871 A1    2/2003

(Continued)

OTHER PUBLICATIONS

U.S. Appl. No. 10/870,060, filed Jun. 18, 2004, Kossi et al.

(Continued)

*Primary Examiner*—Guy Lamarre
*Assistant Examiner*—Esaw T. Abraham
(74) *Attorney, Agent, or Firm*—Morgan & Finnegan, L.L.P.

(57) ABSTRACT

Generating a protected content stream from a data stream provides enhanced security in short-range wireless communications networks. This protected content stream is transmitted across a first short-range communications link. In addition, information for converting the protected content stream into the data stream is transmitted across a second link. The first link may be an ultra wideband (UWB) link, while the second link may be a Bluetooth link.

39 Claims, 12 Drawing Sheets

U.S. PATENT DOCUMENTS

| | | |
|---|---|---|
| 2003/0032422 A1 | 2/2003 | Wynbeek |
| 2003/0063196 A1 | 4/2003 | Palatov et al. |
| 2003/0078037 A1 | 4/2003 | Auckland et al. |
| 2003/0100288 A1 | 5/2003 | Tomlinson, Jr. et al. |
| 2003/0108010 A1 | 6/2003 | Kim et al. |
| 2003/0137966 A1 | 7/2003 | Odman et al. |
| 2003/0147453 A1 | 8/2003 | Bantra |
| 2003/0148767 A1 | 8/2003 | Sugaya et al. |
| 2003/0174046 A1 | 9/2003 | McCorkle |
| 2003/0203741 A1 | 10/2003 | Matsuo et al. |
| 2004/0066762 A1 | 4/2004 | Alastalo |
| 2004/0204076 A1 | 10/2004 | Kotzin |
| 2004/0219897 A1 | 11/2004 | Choi |
| 2005/0037775 A1 | 2/2005 | Moeglein et al. |
| 2005/0058107 A1 | 3/2005 | Salokannel et al. |
| 2005/0058116 A1 | 3/2005 | Palin et al. |
| 2005/0058152 A1 | 3/2005 | Salokannel et al. |
| 2005/0059345 A1 | 3/2005 | Palin et al. |
| 2005/0078598 A1 | 4/2005 | Batra et al. |
| 2005/0193309 A1 | 9/2005 | Grilli et al. |
| 2005/0283207 A1 | 12/2005 | Hochmair et al. |

FOREIGN PATENT DOCUMENTS

| | | |
|---|---|---|
| DE | 10140446 A1 | 3/2003 |
| EP | 0999717 A2 | 5/2000 |
| EP | 1 185 033 A1 | 3/2002 |
| EP | 1274194 A1 | 1/2003 |
| EP | 1515473 A2 | 3/2005 |
| GB | 2 287 383 | 9/1995 |
| WO | WO 99/38302 | 7/1999 |
| WO | WO 99/41876 | 8/1999 |
| WO | WO 01/45319 | 6/2001 |
| WO | WO 02/21746 A2 | 3/2002 |
| WO | WO 03/084146 A1 | 10/2003 |

OTHER PUBLICATIONS

The Bluetooth Special Interest Group, Specification of The Bluetooth System, vol. 1 & vol. 2, Core and Profiles: Version 1.1, Feb. 22, 2001.

O'Donnell et al., "An Integrated, Low Power, Ultra-Wideband Transceiver Architecture for Low-Rate, Indoor Wireless Systems", Dept. of Electrical Engineering & Computer Science, University of California, Berkeley, Berkeley, CA, 8 pgs.

P. I. I. Withington, et al., "An Impulse Radio Communication System", "Proceedings of the International Conference on Ultra-Wideband, Short Pulse Electromagnetics", (ISBN 0-306-44530-1), Oct. 19, 1992, pp. 113-200.

J. Bray and C. Sterman, "Bluetooth 1.1-Connect Without Cables", Prentice Hall Inc., Upper Saddle River, NJ 1002 (ISBN 0-13-066106-6), Sects. 5.4., pp. 70-78.

D. J. Costello, Jr., et al., "Applications of Error-Control Coding", IEEE Transactions of Information Theory, Oct. 1998, vol. 44, pp. 2531-2560.

Walter Hirt, "Ultra-wideband radio technology: overview and future research", Computer Communications, Amsterdam, NL, vol. 26, No. 1, Feb. 2003, pp. 46-52.

PCT Search Report, Oct. 10, 2005, 6 pages.

* cited by examiner

METHOD AND SYSTEM FOR PROVIDING COMMUNICATIONS SECURITY

FIELD OF THE INVENTION

The present invention relates to wireless communications. More particularly, the present invention relates to techniques for providing communications security.

BACKGROUND OF THE INVENTION

Information transferred across short-range wireless communications networks are often susceptible to interception by eavesdropping devices. When transmissions are intercepted, the privacy concerns of individuals may be compromised. Moreover, the interception of transmissions can dilute the value of various forms of content, such as multimedia entertainment, music, and software. Accordingly, there is a need to prevent the interception of wireless transmissions by unintended recipients.

Various techniques for protecting content currently exist. Such techniques involve encrypting content with a mechanism such as an encryption key. Once received, the intended recipient (which also possesses the encryption key or a corresponding decryption key) may decrypt the transmitted content. However, according to these techniques, the employed encryption key is fixed in nature. Thus, if an eavesdropper acquires the employed key, it is possible to decrypt the transmitted data using the key.

Various forms of short-range networks exist. Since gaining approval by the Federal Communications Commission (FCC) in 2002, ultra wideband (UWB) techniques have become an attractive solution for short-range wireless communications because they allow for devices to exchange information at relatively high data rates.

Although UWB systems for short-range networks are relatively new, their transmission techniques have been known for decades. In fact, the first radio transmission was made by a UWB technique when Heinrich Hertz discovered radio waves in 1887. This discovery was made with a spark gap transmitter, which can be viewed as an early UWB radio. Later on, such transmitters were banned because they emitted wide spectrum transmissions.

Current FCC regulations permit UWB transmissions for communications purposes in the frequency band between 3.1 and 10.6 GHz. However, for such transmissions, the spectral density has to be under −41.3 dBm/MHz and the utilized bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps make IR much more immune to multipath propagation problems than conventional continuous wave radios. RF gating is a particular type of IR in which the impulse is a gated RF pulse. This gated pulse is a sine wave masked in the time domain with a certain pulse shape.

IR transmission facilitates a relatively simple transmitter design, which basically requires a pulse generator and an antenna. This design does not necessarily require a power amplifier, because transmission power requirements are low. In addition, this design does not generally require modulation components such as voltage controlled oscillators (VCOs) and mixers, because the impulses are baseband signals.

In general, IR receiver designs are more complex than their corresponding transmitter designs. However, basically, these designs are much simpler than conventional receiver designs because they typically do not employ intermediate frequency (IF) signals or filters. However, to fulfill spectral requirements, IR impulses have to be very short in duration (e.g., a couple of nanoseconds). This requirement places stringent timing demands on receiver timing accuracy. The fulfillment of these demands can also provide IR receivers with accurate time resolution and positioning capabilities.

Other short-range networks exist but do not provide the high data rates offered by UWB. One such network is Bluetooth. Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

Other short-range network standards include IEEE 802.11x, IEEE 802.15, IrDa, and HIPERLAN.

SUMMARY OF THE INVENTION

The present invention provides for enhanced security in short-range wireless communications networks. Accordingly, the present invention is directed to methods and devices that generate a protected content stream from a data stream, and transmit the protected content stream across a first short-range communications link. In addition, the methods and devices transmit across a second short-range communications link information for converting the protected content stream into the data stream. The first link may be a UWB link, while the second link may be a Bluetooth link.

The protected content stream may include one or more packets, each having inserted errors, for example, at predetermined positions. Thus, the information for converting the protected content stream into the data stream may include the error positions and the code used to generate the errors. The positions of these errors may be selected at random. A code, such as a polynomial based code, may be used to generate the errors. Additionally, the packets may contain error detection codes and/or error correction codes.

In aspects of the present invention, the protected content stream may be generated by formatting the data stream into multiple data packets, generating at least one additional packet, and arranging the additional packet and the data packets into the protected content stream. Thus the information for converting may include the position of the additional packet. The position of the additional packet may be randomly selected. In these aspects, the data packets and additional packet may each include a field having an error detection code and/or error correction code.

In further aspects of the present invention, the protected content stream is generated by placing the data stream into multiple packets that each have an error correction code, which is set. At this point, errors are injected into the packets, such that the corresponding error correction codes are unable to correct these errors. The values and locations of these errors are included in the information for converting and may be selected at random.

Also, the protected content stream may be generated by encrypting the data stream with an encryption key. In such aspects, the information for converting includes a key for decrypting the protected data stream. This key may be the encryption key or a corresponding decryption key.

The present invention is also directed to methods and devices which receive the protected content stream from the first short-range communications link, and receive from the second short-range communications link information for converting the protected content stream into the data stream. Once this information is received, the data stream may be generated from the protected content stream.

Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
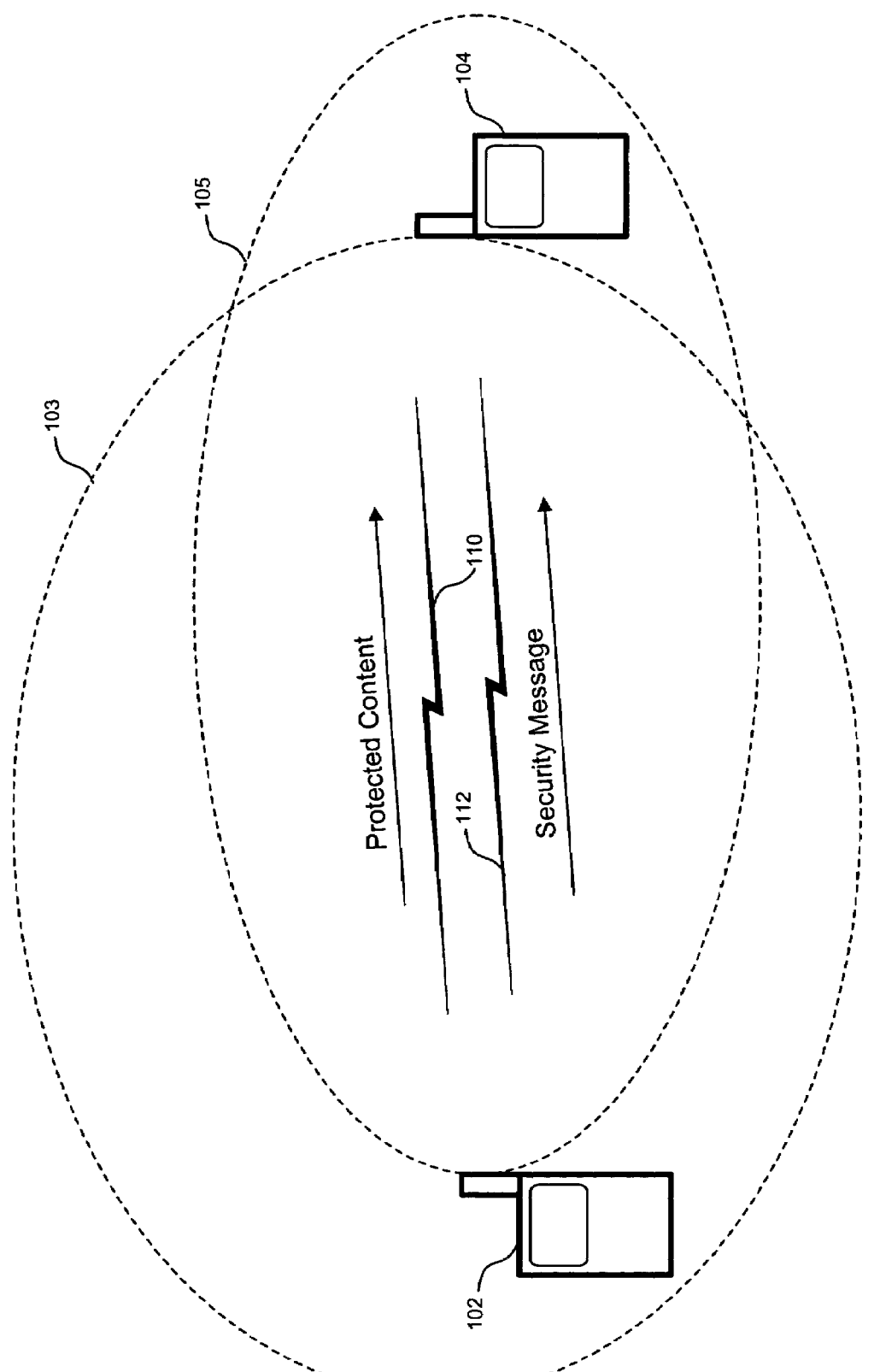
FIG. 1 is a diagram of an exemplary operational environment.

Before describing the invention in detail, it is helpful to describe an environment in which the invention may be used. Accordingly, FIG. 1 is a diagram of an operational environment which includes wireless communications devices 102 and 104.

Devices 102 and 104 are capable of engaging in wireless communications across at least two different types of short-range wireless links. For example, devices 102 and 104 may support both Bluetooth and UWB links.

Devices 102 and 104 each have a communications range that is defined by a coverage area. As shown in FIG. 1, a coverage area 103 defines the communications range of device 102, while a coverage area 105 defines the communications range of device 104. These coverage areas illustrate a range in which the corresponding device can communicate across two different link types (e.g., both Bluetooth and UWB).

In the environment of FIG. 1, devices 102 and 104 are within each other's communications ranges. Accordingly, a first wireless communications link 110 and a second wireless communications link 112 are established between devices 102 and 104. These links may be of different types. For instance, first link 110 may be a UWB link, while second link 112 may be a Bluetooth link.

Various techniques may be employed in establishing these links. For instance, device 102 may communicate across first link 110 to establish second link 112, and to initiate communications across link 112. Examples of this technique are described in the copending U.S. patent application filed on Sep. 12, 2003 entitled "Method and System for Establishing a Wireless Communications Link", Attorney Docket No. 4208-4144 (application Ser. No. currently unassigned) by inventors Arto Palin, Juha Salokannel, and Jukka Reunamäki. This application is incorporated herein by reference in its entirety.

In the environment of FIG. 1, the present invention provides for secure communications by device 102 transmitting content in a protected (i.e., scrambled) format across first link 110. In addition, device 102 transmits information necessary for descrambling this protected content across second link 112 in the form of a security message. The employment of two links in this manner provides enhanced security because eavesdropping devices must receive transmissions from both links to descramble the protected content. Moreover, in aspects of the present invention, attributes pertaining to the scrambling of content can be dynamically changed to make interception of the content more difficult. When a dynamic change occurs, a new security message may be transmitted across link 112 to inform an intended recipient of the new attributes.

II. Wireless Communications Device

Figure 2:
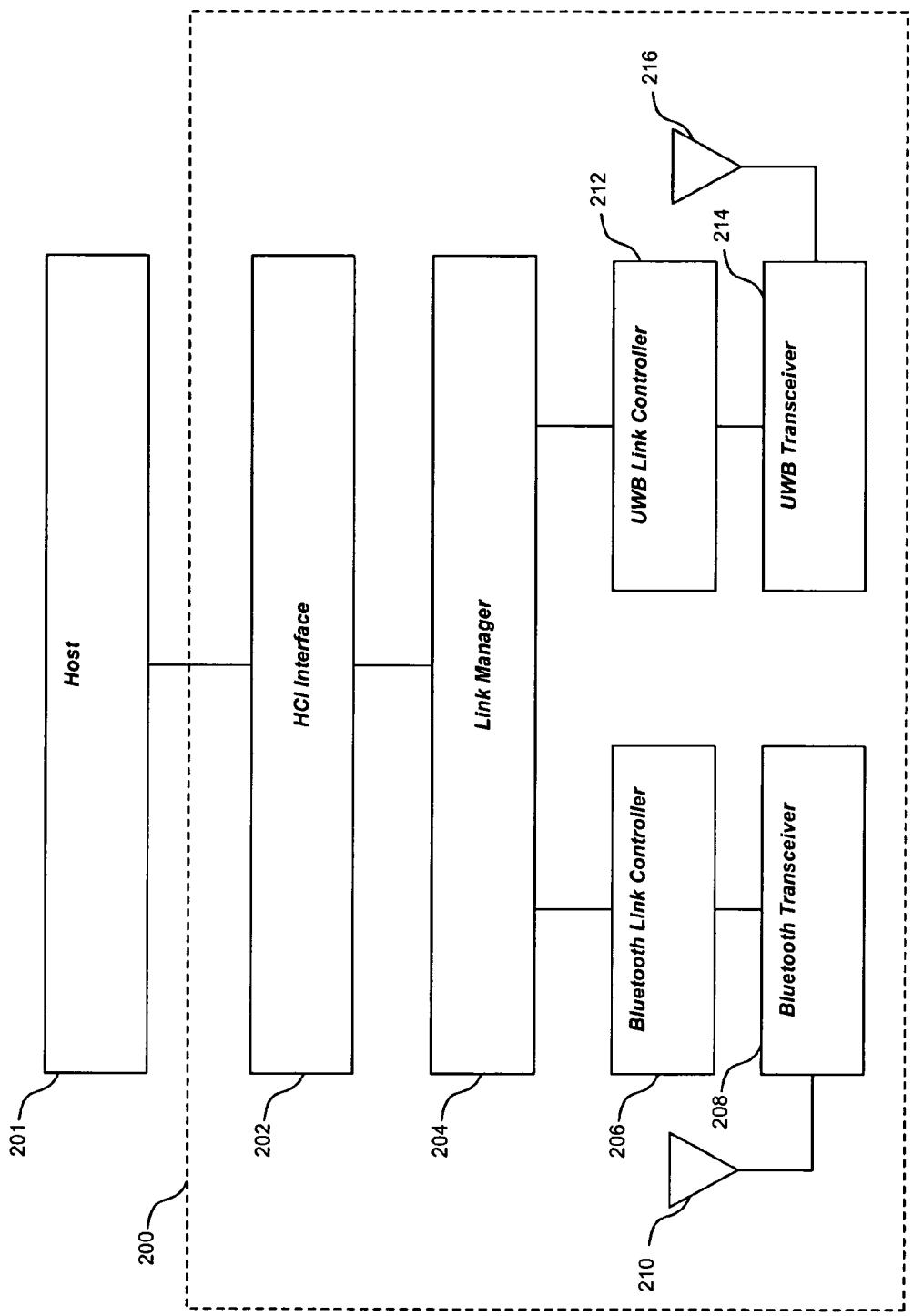
FIG. 2 is a block diagram of an exemplary communications device architecture in accordance with embodiments of the present invention.

FIG. 2 is a block diagram showing a wireless communications device architecture, which may be used for devices 102 and 104, in accordance with the present invention. This architecture may be employed with the various systems and methods described herein for securely transmitting content through two communications links. Although this architecture is described in the context of Bluetooth and UWB communications, it may be employed with other wireless communications technologies.

The device architecture of FIG. 2 includes a host 201, which is coupled to a segment 200. Host 201 is responsible for functions involving user applications and higher protocol layers, while segment 200 is responsible for lower layer protocols, such as Bluetooth (e.g., basic rate, medium rate or higher rate), UWB, and/or other specific communications.

As shown in FIG. 2, segment 200 includes a host controller interface (HCI) 202, a link manager 204, a Bluetooth (BT) link controller 206, a Bluetooth (BT) transceiver 208, an antenna 210, a LWB link controller 212, a UWB high rate (UWB/HR) transceiver 214, and an antenna 216.

Link manager 204 performs functions related to Bluetooth link and UWB link set-up, security and control. These functions involve discovering corresponding link managers at remote devices and communicating with them according to the link manager protocol (LMP). More particularly, link manager 204 exchanges LMP PDUs with link managers at remote devices.

Link manager 204 exchanges information with host 201 across HCI 202. This information may include commands received from host 201, and information transmitted to host 201. HCI 202 defines a set of messages, which provide for this exchange of information.

BT link controller 206 operates as an intermediary between link manager 204 and BT transceiver 208. Link controller 206 also performs baseband processing for Bluetooth transmissions, such as error correction encoding and decoding. In addition, link controller 206 exchanges data between corresponding link controllers at remote devices according to physical layer protocols. Examples of physical layer protocols include retransmission protocols such as the automatic repeat request (ARQ) protocol.

BT transceiver 208 is coupled to antenna 210. Transceiver 208 includes electronics to (in conjunction with antenna 210) exchange wireless Bluetooth signals with devices, such as remote device 104. Such electronics include modulators, demodulators, amplifiers, and filters.

UWB link controller 212 operates as an intermediary between link manager 204 and UWB/HR transceiver 214. Link controller 212 also performs baseband processing for UWB transmission, such as error correction encoding and decoding. In addition, link controller 212 exchanges data between corresponding link controllers at remote devices according to physical layer protocols. Examples of such physical layer protocols include retransmission protocols such as the automatic repeat request (ARQ) protocol.

UWB/HR transceiver 214 is coupled to an antenna 216. Transceiver 214 includes electronics to (in conjunction with antenna 216) exchange wireless UWB or HR signals with devices, such as remote device 104. For the transmission of UWB signals, such electronics may include a pulse generator. For the reception of UWB signals, such electronics may include timing circuitry and filters.

Figure 3:
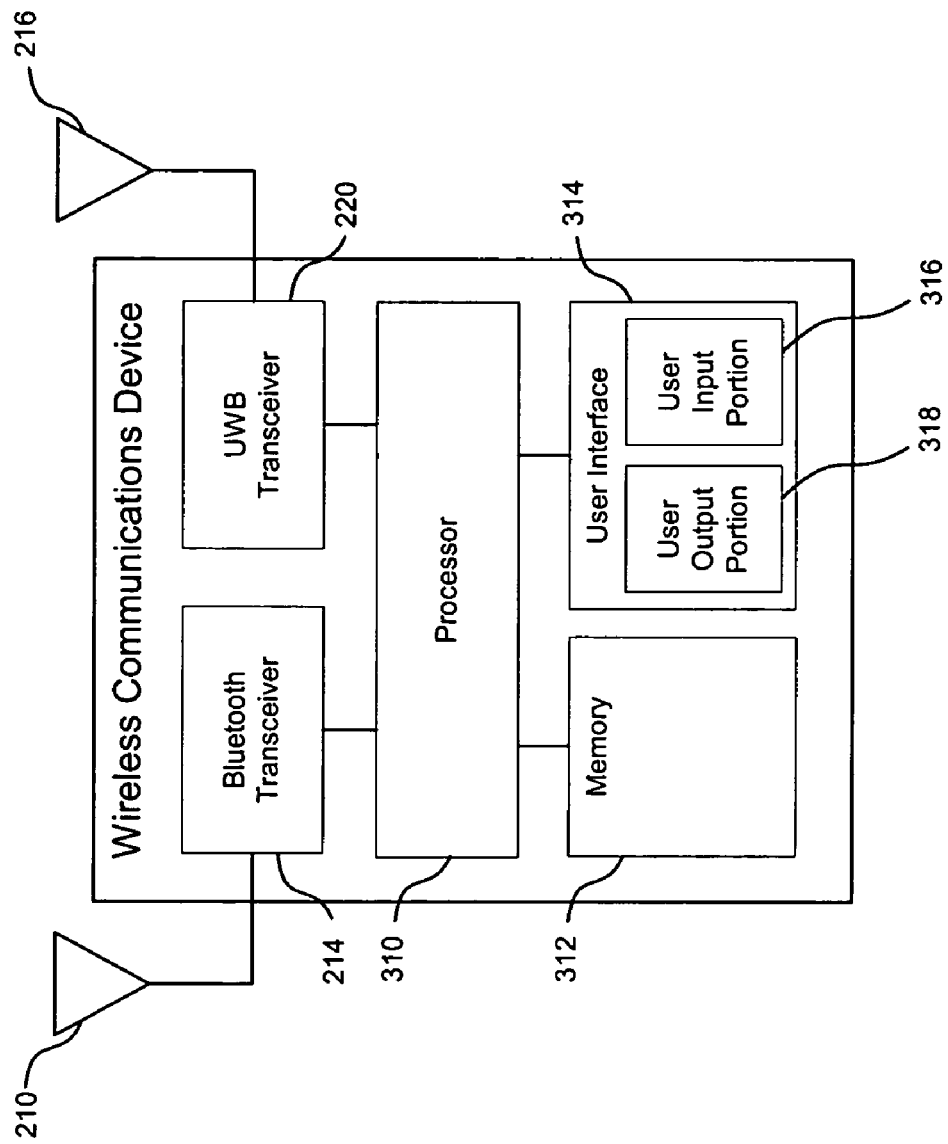
FIG. 3 is a block diagram of an exemplary communications device implementation.

The architecture of FIG. 2 may be implemented in hardware, software, firmware, or any combination thereof. One such implementation is shown in FIG. 3. This implementation includes a processor 310, a memory 312, and a user interface 314. In addition, the implementation of FIG. 3 includes Bluetooth transceiver 214, antenna 216, UWB transceiver 220, and antenna 222. Transceivers 214 and 220 may be implemented as described above with reference to FIG. 2.

As shown in FIG. 3, processor 310 is coupled to transceivers 214 and 220. Processor 310 controls device operation. Processor 310 may be implemented with one or more microprocessors that are each capable of executing software instructions stored in memory 312.

Memory 312 includes random access memory (RAM), read only memory (ROM), and/or flash memory, and stores information in the form of data and software components (also referred to herein as modules). These software components include instructions that can be executed by processor 310. Various types of software components may be stored in memory 312. For instance, memory 312 may store software components that control the operations of transceivers 214 and 220. Also, memory 312 may store software components that provide for the functionality of host 202, HCI interface 208, link manager 210, link controller 212, and UWB module 218.

In addition, memory 312 may store software components that control the exchange of information through user interface 314. As shown in FIG. 3, user interface 314 is also coupled to processor 310. User interface 314 facilitates the exchange of information with a user. FIG. 3 shows that user interface 314 includes a user input portion 316 and a user output portion 318. User input portion 316 may include one or more devices that allow a user to input information. Examples of such devices include keypads, touch screens, and microphones. User output portion 318 allows a user to receive information from WCD 102. Thus, user output portion 318 may include various devices, such as a display, and one or more audio speakers. Exemplary displays include liquid crystal displays (LCDs), and video displays.

The elements shown in FIG. 3 may be coupled according to various techniques. One such technique involves coupling transceivers 214 and 220, processor 310, memory 312, and user interface 314 through one or more bus interfaces. In addition, each of these components is coupled to a power source, such as a removable and rechargeable battery pack (not shown).

III. Packet Communications

According to the present invention, secure communications are provided by transmitting protected content across a first communications link, and corresponding security messages across a second communications link. The protected content may be in the form of packets. Accordingly, FIG. 4 is a diagram of an exemplary packet format for transmissions across the first communications link.

Figure 4:
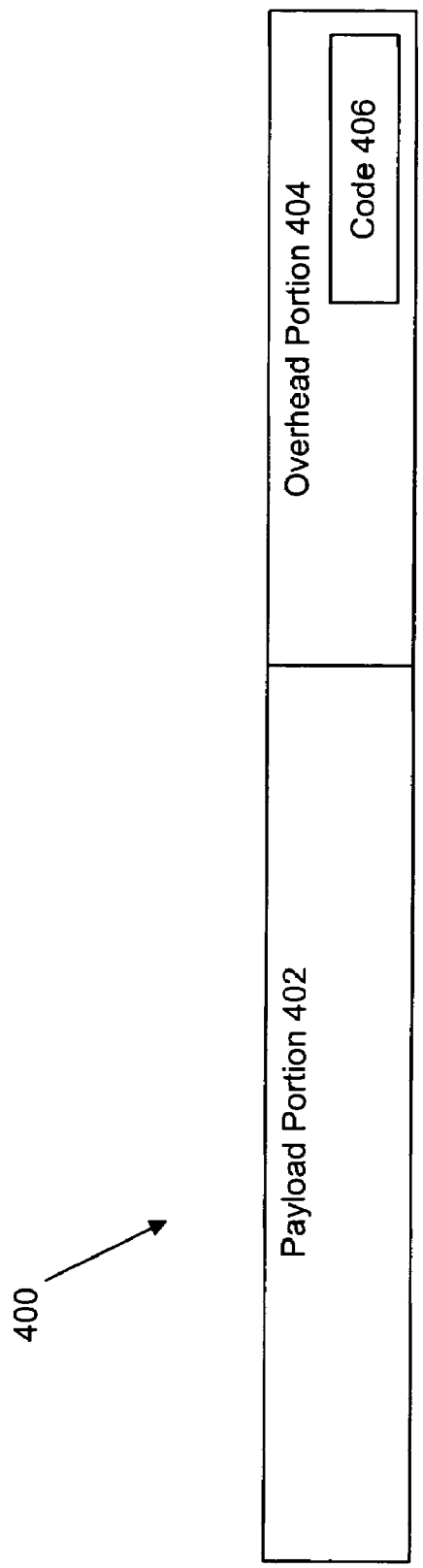
FIG. 4 is a diagram an exemplary transmission packet.

FIG. 4 shows a packet (also referred to as a frame) 400. Packet 400 includes a payload portion 402, which contains data (i.e., content), and an overhead portion 404. Overhead portion 404 may include information pertaining to the transfer of the data, such as source and/or destination addresses.

In addition, overhead portion may also include an error detection and/or error correction code 406, which may be used by the receiver of packet 400 to detect and/or correct errors payload portion 402. During transmission, these errors may be caused by sources such as electromagnetic noise and interfering transmissions.

Further, according to the present invention, errors may be intentionally introduced by the device transmitting the protected content stream. This introduction of errors produces a scrambled transmission. Details regarding these intentionally introduced errors may then be transmitted across the second link in one or more security messages. Upon receipt of the scrambled transmission and the security message(s), the receiving device may use the information in the security message(s) to descramble the transmission. According to such techniques, interception of the protected content stream also requires receipt of the security message(s).

Code 406 may include an error correction code. This error code may be a block code, such as a Hamming code. However, other error correction codes may be used such as Reed-Solomon codes and Viterbi codes. In embodiments, code 406 may involve concatenated codes, such as an inner code (e.g., Reed-Solomon) and an outer codes (e.g., Viterbi). Alternatively, or additionally, code 406 may include an error detection code, such as a cyclical redundancy check (CRC).

IV. Secure Communications

Figure 5:
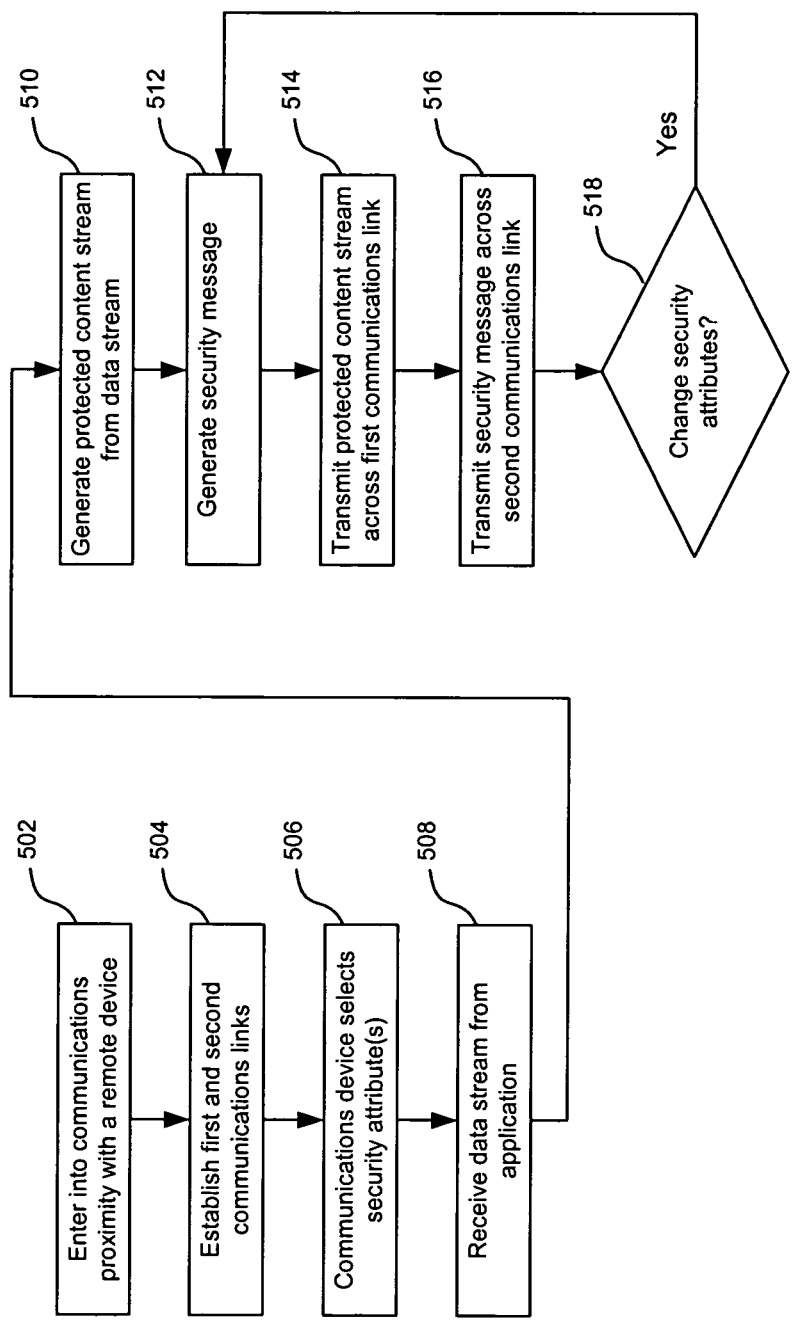
FIG. 5 is a flowchart of a secure communications technique.

FIG. 5 is a flowchart of an operational sequence that is performed by a communications device, such as device 102. This sequence includes multiple steps, which may be performed in a variety of orders. Moreover, any number of these steps may be performed in parallel. Also, modifications to this sequence, such as the performance of additional steps, may be made.

This process begins with a step 502, in which the communications device and a remote device (such as device 104) enter into short-range communications proximity. Next, in a step 504, the communications device establishes first and second communications links with the remote device. These links may be established in succession. For instance, the second link (e.g., a Bluetooth link) may be established and then employed to establish the first link (e.g., a UWB link). Examples of such techniques are described in the copending U.S. patent application filed on Sep. 12, 2003 entitled "Method and System for Establishing a Wireless Communications Link", Attorney Docket No. 4208-4144 (application Ser. No. currently unassigned).

As described above with reference to FIG. 1, the first and second links may be short-range links of different types. For instance, the first link may be an ultra wideband (UWB) link and the second link may be a Bluetooth link. However, other link types may be employed. Examples of other link types include those compatible with standards, such as IEEE 802.11x, IEEE 802.15, IrDa, and/or HIPERLAN.

In a step 506, the communications device selects one or more security attributes. As will be described below, examples of such attributes include security technique, error codes, error locations, and/or encryption keys.

In a step 508, a data stream is received from an application. This application may be running on the device, for example in host 201. However, in further aspects, this application may be running on a separate device that is coupled to the communications device. Examples of applications include server applications, video applications, telephony applications, as well as other applications.

In a step 510, the device generates a protected content stream from the data stream. This generation is based on the security attribute(s) selected in step 506. Step 510 may include formatting the data stream into one or more data packets. As described above with reference to FIG. 4, each of these data packets may include a field having an error detection code and/or an error correction code. Examples of such codes include CRC and Hamming codes.

In a step 512, the device generates a security message. This message contains information for converting the protected content stream into the data stream. Examples of such information include as error codes, error locations, and/or encryption keys.

In a step 514, the device transmits the protected content stream across the first communications link to a remote device (such as device 104).

In a step 516, the device transmits the security message across the second communications link to the remote device. Steps 514 and 516 may be performed in parallel.

The steps of FIG. 5 may be repeated, as would be apparent to persons skilled in the relevant arts. In addition, the present invention provides for security attributes to be dynamically changed. For instance, a step 518 shows that the communications device may change security attributes (such as error codes, error locations, and/or encryption keys) at any point during the transmission of the protected content stream. If any security attributes are changed, FIG. 5 shows that operation proceeds to step 512, where a new security message is generated. This new message conveys information for converting the protected content stream into the data stream in accordance with the current security attributes.

As described above, a protected content stream is generated in step 510. Various techniques may be employed to generate this content stream. Examples of these techniques are described below with reference to FIGS. 6-11.

V. Error Insertion

Figure 6:
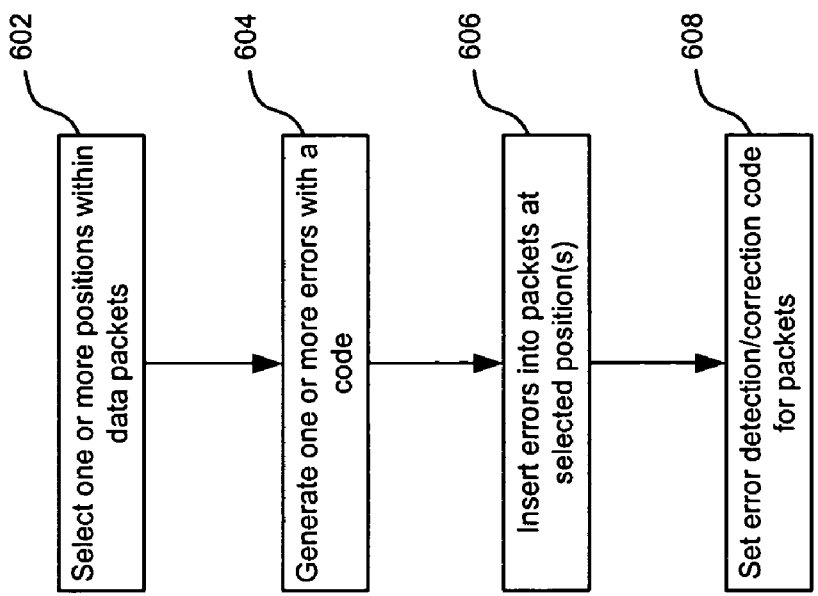
FIG. 6 is a flowchart of protected content stream generation according to a first technique.

A first technique involves the insertion of errors into locations of packets. An example of this technique is shown in the flowchart of FIG. 6. As shown in FIG. 6, this technique includes a step 602 in which the communications device selects one or more positions within the data packets generated in step 510. This selection may be random.

In a step 604, the communications device generates one or more errors with a code. This code may be based on a polynomial.

In a step 606, the communications device inserts errors generated in step 604 into portions of the packets. These portions of the packets are at the positions selected in step 602.

A step 608 follows step 606. In this step, the communications device sets the error correction code for each of the packets.

As described above with reference to FIG. 5, the communications device transmits one or more security messages in step 516. When the steps of FIG. 6 are performed, the one or more security messages convey the predetermined positions selected in step 602 and the code used to generate the one or more errors in step 606.

Figure 7:
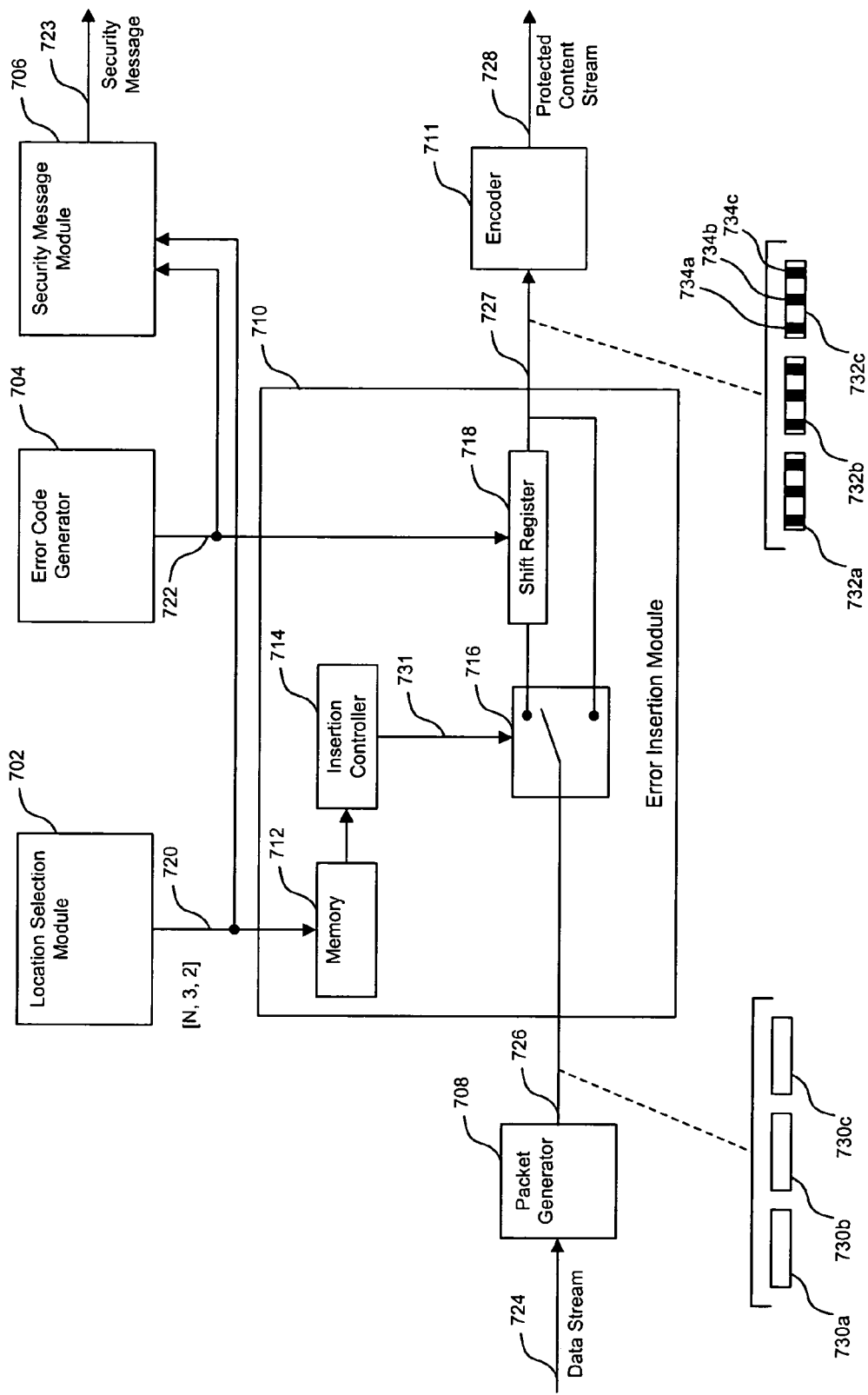
FIG. 7 is a diagram of an implementation for performing content stream generation according to the first technique.

FIG. 7 is a block diagram of an implementation that may be used to employ the techniques described above with reference to FIG. 6. This implementation includes a location selection module 702, an error code generator 704, a security message module 706, a packet generator 708, an error insertion module 710, and an encoder 711. The elements of FIG. 7 may be implemented in hardware, software, firmware, or any combination thereof. This implementation is provided as an example. Other implementations for performing the error insertion techniques are also within the scope of the present invention.

Location selection module 702 selects one or more locations within data packets for errors to be inserted. These locations may be selected randomly. The selected locations may specify portions of a packet spanning one or more contiguous symbols (e.g., bits). FIG. 7 shows that location selection module 702 generates a location signal 720, which indicates the location(s) selected for error insertion. For example, FIG. 7 shows the selection of three payload locations (symbols N, 3, and 2). These three locations specify a repeating pattern for error insertion into each packet.

Error code generator 704 generates a code 722 that is employed to insert errors into the data packets at the locations selected by location selection module 702. This code may be a polynomial to define operation of a shift register.

Packet generator 708 receives a data stream 724 and formats it into a data packet stream 726, which includes a plurality of packets 730. These packets may be in a format, such as the one described above with reference to FIG. 4. As shown in FIG. 7, error insertion module 710 receives data packet stream 726, location signal 720, and code 722. From these inputs, error insertion module 710 generates a scrambled content stream 727. Scrambled content stream 727 includes a plurality of packets 732. FIG. 7 shows that each of these packets includes a error 734 inserted by error insertion module 710.

Error insertion module 710 includes a memory 712, an insertion controller 714, a routing module 716, and a shift register 718. Memory 712 stores the location(s) indicated by location signal 720. Insertion controller 714 generates an insertion signal 731 based on the location(s) stored in memory 712. This signal is sent to routing module 716 when data packet stream 726 is at one of the selected location(s).

Upon receipt of insertion signal 730, routing module 716 sends symbols in data packet stream 726 to shift register 718. Shift register 718 operates according to a polynomial defined by code 722. Thus, shift register 718 "scrambles" the portions of data packet stream 726 that it receives from routing module 716. This scrambling results in scrambled content stream 727.

As described above, protected content stream 727 includes a plurality of packets 732, each having injected errors indicated in FIG. 7 by shading. For example, packet 732c includes error 734a-c that were injected by shift register 718. These errors are at the locations specified by location signal 720.

Encoder 711 receives scrambled content stream 727. Upon receipt of each packet 732, encoder 711 computes a corresponding error detection and/or correction code. Encoder 711 then inserts this code into the error detection/correction field of the packet 732. As a result, encoder 711 generates protected content stream 728.

Security message module 706 receives location signal 720 and code 722. From these inputs, module 706 generates a security message 723 to be sent to a remote device across the second short-range communications link. As described above, this message allows for the remote device to convert protected content stream 728 into packet data stream 726.

The elements of FIG. 7 may be allocated to various portions in the architecture of FIG. 2. In an exemplary allocation, location selection module 702 and error code generator 704 may be included in link manager 204, while security message module 706 may be included in Bluetooth link controller 206. Also in this exemplary allocation, packet generator 708, error insertion module 710, and encoder 711 may be included in UWB link controller 212.

VI. Additional Packet Generation

Figure 8:
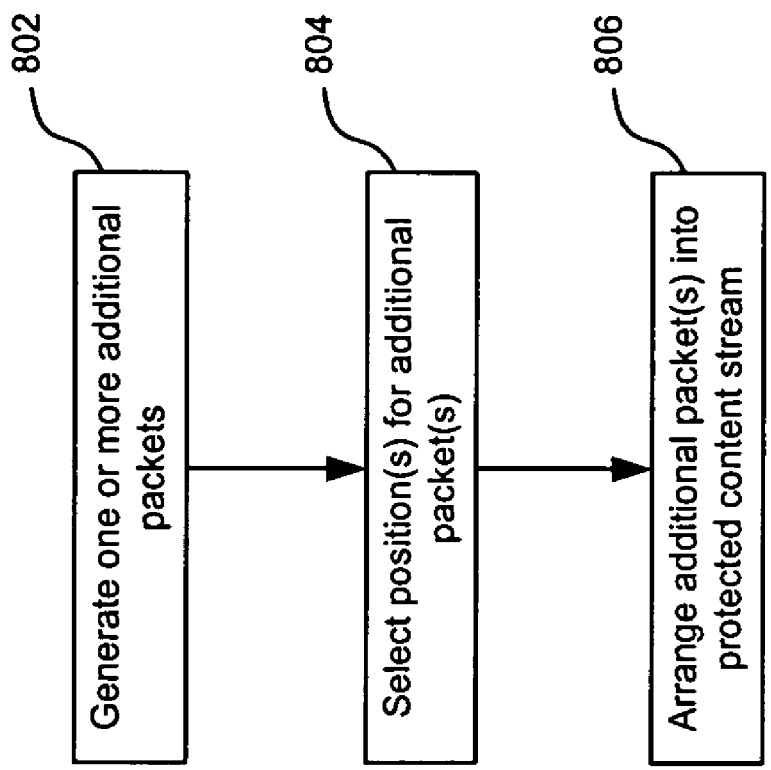
FIG. 8 is a flowchart of protected content stream generation according to a second technique.

A second technique of generating the protected content stream involves the generation of additional packets. An example of this technique is shown in the flowchart of FIG. 8.

This technique includes a step 802. In this step, the communications device generates one or more packets in addition to the data packets generated in step 510. Like the data packets generated in step 510, these additional packet(s) also include a field having an error detection code and/or an error correction code.

In a step 804, the communications device selects positions of the at least one additional packet. This position may be randomly selected.

A step 806 follows step 804. In this step, the communications device arranges one or more additional packets and the data packets into the protected content stream.

When the steps of FIG. 8 are performed, the security message(s) transmitted in step 516 include the position of the additional packet(s) in the protected content stream.

Figure 9:
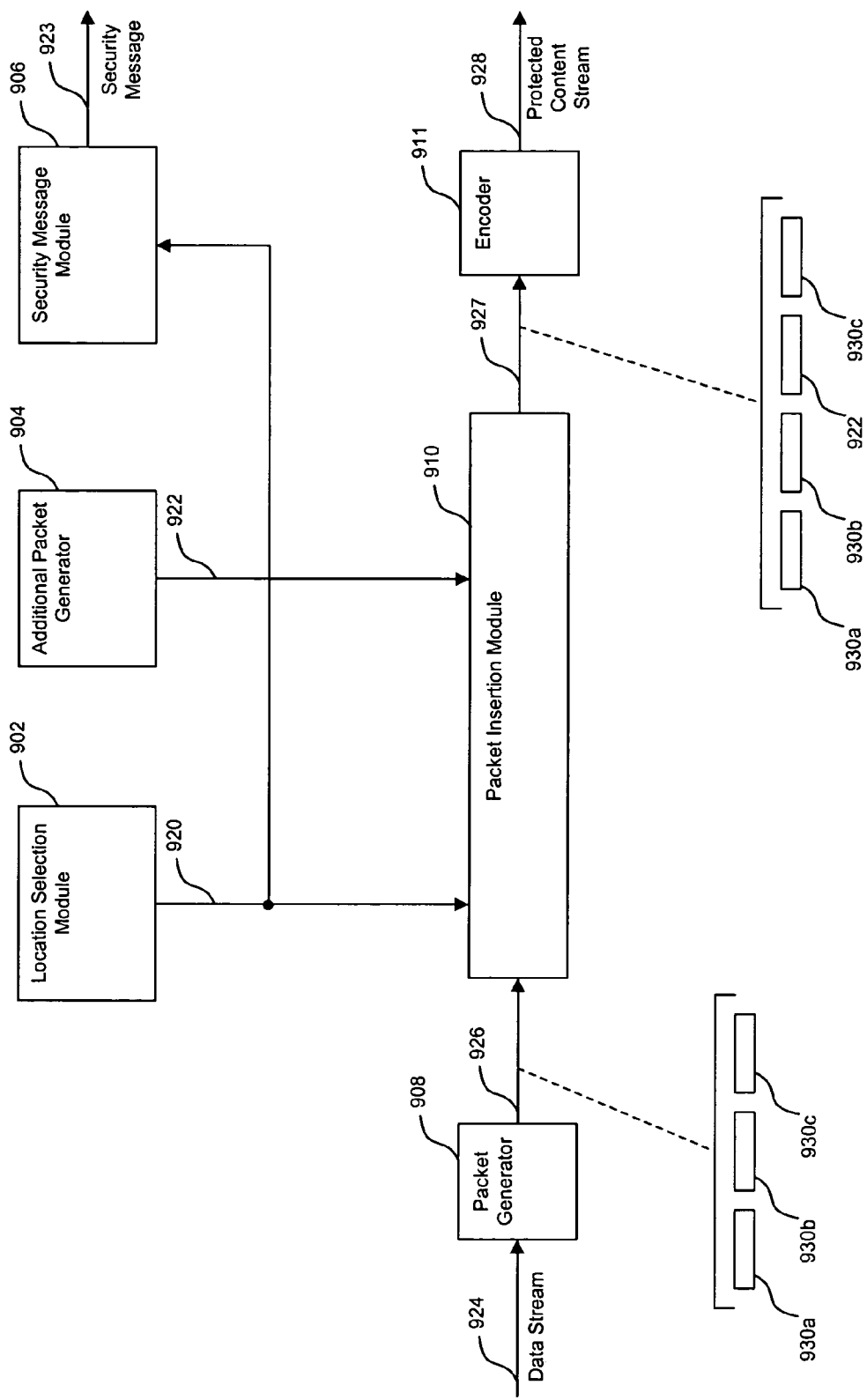
FIG. 9 is a diagram of is a diagram of an implementation for performing content stream generation according to the second technique.

FIG. 9 is a block diagram of an implementation that may be used to employ the techniques described above with reference to FIG. 8. This implementation includes a location selection module 902, an additional packet generator 904, a security message module 906, a packet generator 908, a packet insertion module 910, and an encoder 911. The elements of FIG. 9 may be implemented in hardware, software, firmware, or any combination thereof. This implementation is provided as an example. Other implementations for performing the error insertion techniques are also within the scope of the present invention.

Packet generator 908 receives a data stream 924 and formats it into a data packet stream 926, which includes a plurality of packets 930.

Location selection module 902 selects one or more location(s) for additional packet(s) to be inserted into data packet stream 926. These locations may be randomly selected. The selected locations may specify contiguous portions of a packet spanning multiple symbols (e.g., bits). FIG. 9 shows that location selection module 902 generates a location signal 920, which indicates the locations selected for insertion of any additional packets.

Additional packet generator 904 generates one or more packets 922 for insertion into data packet stream 926 at the location(s) selected by location selection module 902. These additional packets may contain randomly generated symbols.

As shown in FIG. 9, packet insertion module 910 receives data packet stream 926 and location signal 920. From these inputs, packet insertion module 910 generates a scrambled content stream 927. Scrambled content stream 927 includes the packets 930 of data packet stream 926. In addition, scrambled content stream 928 includes additional packet(s) 922 generated by additional packet generator 904. These additional packets are at location(s) indicated by location signal 920.

Encoder 911 receives scrambled content stream 927. Upon receipt of each packet 932, encoder 911 computes and inserts a corresponding error detection and/or correction code. Encoder then inserts this code into the error detection/correction field of the packets 930 and 922. As a result, encoder 911 generates protected content stream 928.

Security message module 906 receives location signal 920. From this input, module 906 generates a security message 923 to be sent to a remote device (such as device 104) across the second short-range communications link. As described above, this message allows for the remote device to convert protected content stream 928 into packet data stream 926.

The elements of FIG. 9 may be allocated to various portions in the architecture of FIG. 2. In an exemplary allocation, location selection module 902 and additional packet generator 904 may be included in link manager 204. Also according to this allocation, security message module 906 may be included in Bluetooth link controller 206, while packet generator 708, packet insertion module 910, and encoder 911 may be included in UWB link controller 212.

VII. Extensive Error Injection

Figure 10:
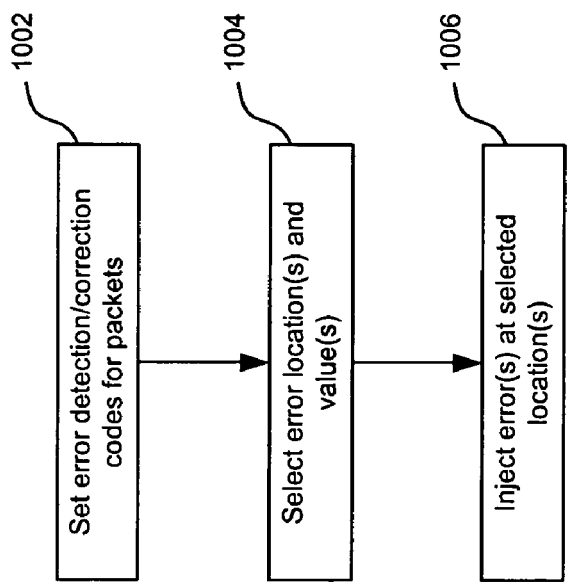
FIG. 10 is a flowchart of protected content stream generation according to a third technique.

A third technique of generating the protected content stream involves injecting errors into the data packets generated in step 510. An example of this technique is shown in FIG. 10. According to this technique, the communications device sets the error detection code and/or error correction code for each of the data packets in a step 1002.

In a step 1004, the communications device selects one or more error values and locations. This selection may be random.

A step 1006 follows step 1004. In step 1006, the communications device injects the error values into the data packets at the selected locations. These injected errors are injected into the data packets to an extent such that the corresponding error correction codes are unable to correct these errors.

When the steps of FIG. 10 are performed, the one or more security messages transmitted in step 516 convey the value(s) and the location(s) for each of the injected errors.

Figure 11:
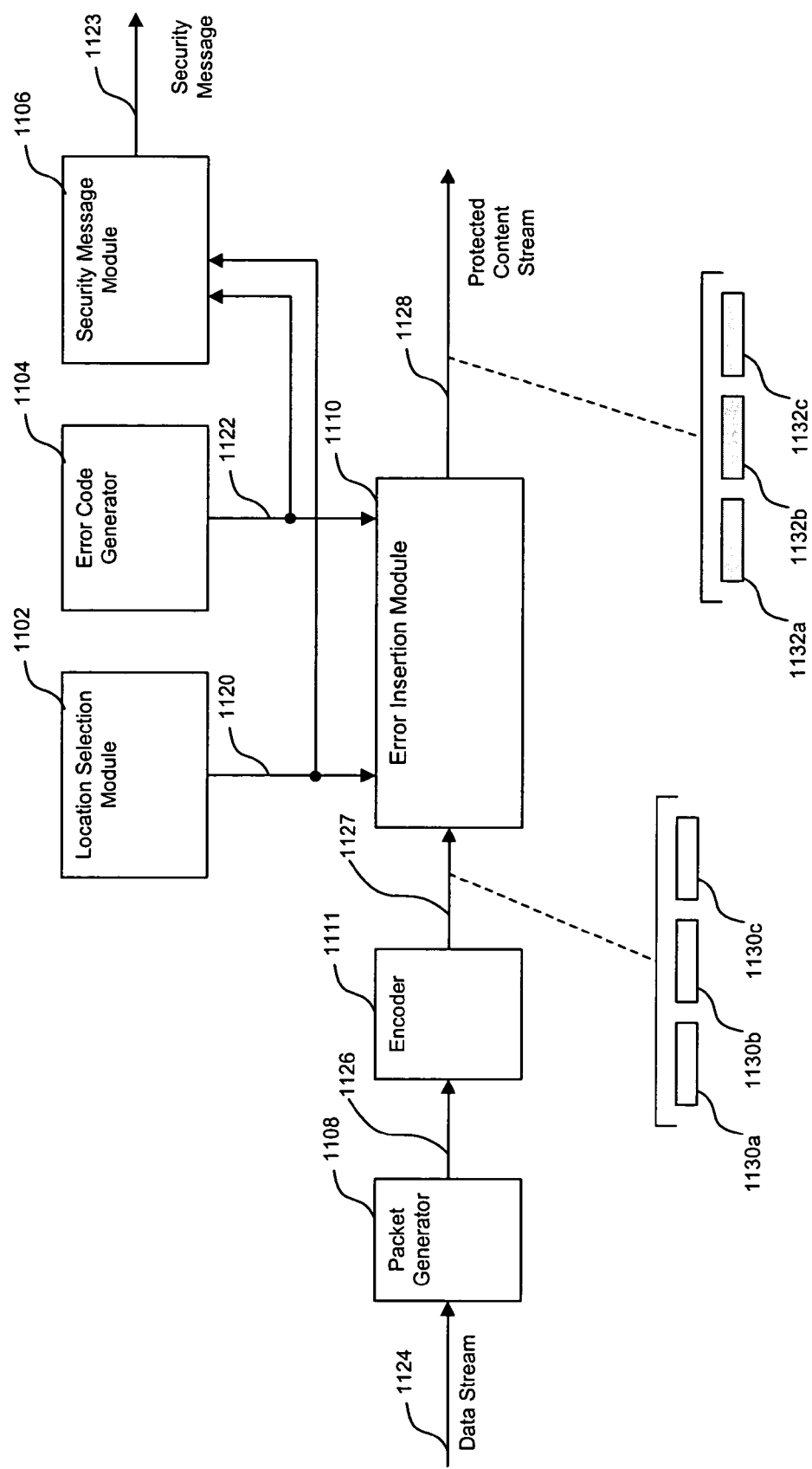
FIG. 11 is a diagram of is a diagram of an implementation for performing content stream generation according to the third technique.

FIG. 11 is a block diagram of an implementation that may be used to employ the techniques described above with reference to FIG. 10. This implementation includes a location selection module 1102, an error code generator 1104, a security message module 1106, a packet generator 1108, an error insertion module 1110, and an encoder 1111. The elements of FIG. 11 may be implemented in hardware, software, firmware, or any combination thereof. This implementation is provided as an example. Other implementations for performing the error insertion techniques are also within the scope of the present invention.

Location selection module 1102 selects one or more locations within data packets for errors to be inserted. These locations may be selected randomly. The selected locations may specify portions of a packet spanning one or more contiguous symbols (e.g., bits). In this case, location selection module 1102 generates a location signal 1120, which indicates a relatively large number of locations selected for error insertion to make error correction unattainable. For example, FIG. 11 shows the selection of three locations. These three locations specify a repeating pattern for error insertion.

Error code generator 1104 generates a code 1122 that is employed to insert errors into the data packets at the locations selected by location selection module 1102. This code may be a polynomial to define operation of a shift register.

Packet generator 1108 receives a data stream 1124 and formats it into a data packet stream 1126, which includes a plurality of packets 1130. As shown in FIG. 11, data packet stream is sent to encoder 1111 receives data packet stream 1126. For each packet 1130, encoder 1111 computes a corresponding error detection and/or correction code. Encoder 1111 then inserts this code into the error detection/correction field of the packet 1130. As a result, encoder 1111 generates content stream 1127.

As shown in FIG. 11, error insertion module 1110 receives content stream 1127, location signal 1120, and code 1122. From these inputs, error insertion module 1110 generates protected content stream 1128. Protected content stream 1128 includes a plurality of packets 1132. FIG. 11 shows that each of these packets includes errors indicated by shading. As shown in FIG. 7, packets 1132 are completely shaded to indicate an extensive number of errors injected throughout these packets. Error insertion module 1110 may be implemented in the manner described above with reference to FIG. 7.

As described above, protected content stream 1128 includes a plurality of packets 1132. FIG. 11 shows that each of these packets includes one or more errors 1134 that were injected by module 1110. These errors are at locations specified by location signal 1120.

Security message module 1106 receives location signal 1120 and code 1122. From these inputs, module 1106 generates a security message 1123 to be sent to a remote device (such as device 104) across the second short-range communications link. As described above, this message allows for the remote device to convert protected content stream 1128 into packet data stream 1126.

The elements of FIG. 11 may be allocated to various portions in the architecture of FIG. 2. For example, location selection module 1102 and error code generator 1104 may be included in link manager 204, security message module 1106 may be included in Bluetooth link controller 206, while packet generator 1108, error insertion module 1110, and encoder 1111 may be included in UWB link controller 212.

VIII. Further Techniques

Further techniques of generating the protected content stream may also be employed. For example, in step 510, the protected content stream may be generated by encrypting the data stream with an encryption key. In this technique, the encryption key and/or corresponding decryption key is included in the security message.

IX. Receiver

Figure 12:
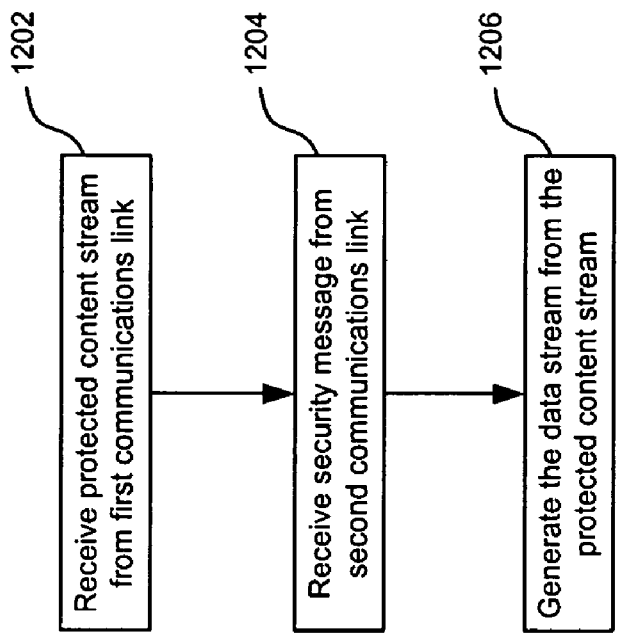
FIG. 12 is a flowchart of an operational sequence performed by a receiving device.

FIG. 12 is a flowchart of an operational performed by a wireless communications device that receives content according to the present invention. As shown in FIG. 12, this sequence includes a step 1202, in which the device receives a protected content stream from a first short-range communications link, such as a UWB link.

In a step 1204, the device receives a security message from a second communications link, such as a Bluetooth link. This message contains information for converting the protected content stream into a data stream. Accordingly, this message may include security attributes, such as security technique, error codes, error locations, and/or encryption keys.

In a step 1206, the device generates the data stream from the protected content stream. This may be based on the security techniques described above with reference to FIGS. 6-11 and their associated attributes (e.g., error codes, locations, and/or encryption keys). The steps of FIG. 12, such as steps 1202 and 1204, may be performed in parallel.

The receiving device may be implemented in the manner described above with reference to FIGS. 2 and 3. For example, step 1202 may be performed by transceiver 214, step 1204 may be performed by transceiver 208, and step 1206 may be performed by controller 212. Such implementations may be in hardware, software, firmware, or any combination thereof.

X. Conclusion

While various embodiments of the present invention have been described above, it should be understood that they have been presented by way of example only, and not in limitation. For instance, although examples have been described involving Bluetooth and UWB technologies, other short-range and longer range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of providing communications security, the method comprising:
    (a) generating a protected content stream from a data stream;
    (b) transmitting the protected content stream across a first short-range radio communications link; and
    (c) transmitting across second short-range radio communications link information for converting the protected content stream into the data stream;
    wherein the protected content stream comprises a packet, and wherein step (a) comprises inserting one or more errors into the packet.

2. The method of claim 1, wherein step (a) further comprises inserting the one or more errors into a portion of the packet, the portion at a predetermined position within the packet.

3. The method of claim 2, wherein step (a) further comprises selecting the predetermined position.

4. The method of claim 2, wherein step (a) further comprises generating the one or more errors with a code.

5. The method of claim 4, wherein the code is based on a polynomial.

6. The method of claim 4, wherein step (c) comprises transmitting the predetermined position and the code across the second short-range radio communications link.

7. The method of claim 1, wherein the packet includes a field containing an error detection code and/or an error correction code, the method further comprising:
setting the error detection code and/or the error correction code after said inserting step.

8. The method of claim 7, wherein the error detection code and/or the error correction code includes a cyclical redundancy check (CRC) code.

9. The method of claim 1, wherein step (a) comprises:
formatting the data stream into a plurality of data packets, each the data packets including a field having an error detection code and/or error correction code;
generating at least one additional packet, the additional packet including a field having an error detection code and/or error correction code; and
arranging the at least one additional packet and the plurality of data packets into the protected content stream.

10. The method of claim 9, wherein the error detection codes and/or the error correction codes for the data packets and the at least one additional packet each include cyclical redundancy check (CRC) codes.

11. The method of claim 9, wherein step (a) further comprises randomly selecting a position of the at least one additional packet in the protected content stream.

12. The method of claim 9, wherein step (c) comprises transmitting across the second short-range radio communications link a position of the at least one additional packet in the protected content stream.

13. The method of claim 1, wherein step (a) comprises:
placing the data stream into a plurality of packets, each the packets including a field having an error correction code;
setting the error correction code for each of the packets; and
injecting errors into one or more of the plurality of packets, such that the corresponding error correction codes are unable to correct these errors.

14. The method of claim 13, wherein the error correction code is a block code.

15. The method of claim 13, wherein step (a) further comprises randomly selecting a value and a location for each of the injected errors.

16. The method of claim 13, wherein step (c) comprises transmitting the value and the location for each of the injected errors across the second short-range radio communications link.

17. The method of claim 1:
wherein step (a) comprises encrypting the data stream with an encryption key; and
wherein step (c) comprises transmitting the encryption key across the second short-range radio communications link.

18. The method of claim 1:
wherein step (a) comprises encrypting the data stream with an encryption key; and
wherein step (c) comprises transmitting a decryption key across the second short-range radio communications link, the decryption key corresponding to the encryption key.

19. The method of claim 1, wherein the first short-range radio communications link is an ultra wideband (UWB) link.

20. The method of claim 1, wherein the second short-range radio communications link is a Bluetooth link.

21. A wireless communications device, comprising:
means for generating a protected content stream from a data stream;
means for transmitting the protected content stream across a first short-range radio communications link; and
means for transmitting across a second short-range radio communications link information for converting the protected content stream into the data stream;
wherein the protected content stream comprises a packet having one or more inserted errors, the one or more errors at one or more errors corresponding position within the packet.

22. A method of providing communications security, the method comprising:
(a) receiving a protected content stream from a first short-range radio communications link;
(b) receiving from a second short-range communications link information for converting the protected content stream into a data stream; and
(c) generating the data stream from the protected content stream;
wherein the protected content stream comprises a packet having one or more inserted errors, the one or more errors at one or more errors corresponding position within the packet.

23. The method of claim 21, wherein step (b) comprises receiving the one or more positions and a code for removing the inserted errors from the packet.

24. The method of claim 23, wherein the code is based on a polynomial.

25. The method of claim 21, wherein the protected content stream comprises a plurality of data packets and at least one additional packet.

26. The method of claim 25, wherein step (b) comprises receiving a position of the at least one additional packet in the protected content stream.

27. The method of claim 26, wherein step (c) comprises removing the at least one additional packet from the protected content stream.

28. The method of claim 21, wherein the protected content stream in encrypted, and wherein step (b) comprises receiving a key for decrypting the protected content stream.

29. The method of claim 21, wherein the first short-range radio communications link is an ultra wideband (USB) link.

30. The method of claim 21, wherein the second short-range radio communications link is a Bluetooth link.

31. A wireless communications device, comprising:
means for receiving a protected content stream from a first short-range radio communications link;
means for receiving from a second short-range communications link information for converting the protected content stream into a data stream; and
means for generating the data stream from the protected content stream;

wherein the protected content stream comprises a packet having one or more inserted errors, the one or more errors at one or more errors corresponding position within the packet.

32. A wireless communications device, comprising:
   a controller configured adapted to generate a protected content stream from a data stream by inserting one or more errors into the packet;
   a first transceiver configured to transmit the protected content stream across a first short-range communications link; and
   a second transceiver configured to transmit across a second short-range radio communications link information for converting the protected content stream into the data stream.

33. The wireless communications device of claim 32, wherein the first short-range communications link is an ultra wideband (UWB) link and the second short-range communications link is a Bluetooth link.

34. A wireless communications device, comprising:
   a first transceiver adapted to receive a protected content stream from a first short-range radio communications link, the protected content stream comprising a packet having one or more inserted errors;
   a second transceiver adapted to receive from a second short-range radio communications link information for converting the protected content stream into a data stream; and
   a controller configured to generate the data stream from the protected content stream.

35. The wireless communications device of claim 34, wherein the first short-range radio communications link is an ultra wideband (UWB) link and the second short-range communications link is a Bluetooth link.

36. A computer program stored on a computer useable medium having computer program logic recorded thereon, executable in a computer system, the computer program logic comprising:
   program code for enabling a processor to generate a protected content stream from a data stream, the protected content stream comprising a packet, and the generation of the protected content stream comprising inserting one or more errors into the packet;
   program code for enabling the processor to transmit the protected content stream across a first short-range radio communications link; and
   program code for enabling the processor to transmit across a second short-range radio communications link information for converting the protected content stream into the data stream.

37. A computer program product stored on a computer useable medium having computer program logic recorded thereon, executable in a computer system, the computer program logic comprising:
   program code for enabling a processor to receive a protected content stream from a first short-range radio communications link, the protected content stream comprising a packet having one or more inserted errors;
   program code for enabling the processor to receive from a second short-range radio communications link information for converting the protected content stream into a data stream; and
   program code for enabling the processor to generate the data stream from the protected content stream.

38. A method of providing communications security, the method comprising:
   (a) generating a protected content stream from a data stream;
   (b) transmitting the protected content stream across a first short-range radio communications link; and
   (c) transmitting across a second short-range radio communications link information for converting the protected content stream into the data stream;
   wherein the protected content stream comprises one or more packets, and wherein step (a) comprises inserting one or more errors in any one or more of the one or more packets.

39. The method of claim 38, wherein step (a) further comprises inserting the one or more errors into a portion of any of the one or more packets, the portion at a predetermined position within said packets.

* * * * *